(12) United States Patent
Conomis

(10) Patent No.: US 9,384,576 B2
(45) Date of Patent: Jul. 5, 2016

(54) METHOD AND DEVICE FOR COMPUTING A CHANGE IN AN IMAGE SCALE OF AN OBJECT

(71) Applicant: Robert Bosch GmbH, Stuttgart (DE)

(72) Inventor: Christos Conomis, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/414,378

(22) PCT Filed: Jul. 10, 2013

(86) PCT No.: PCT/EP2013/064559
§ 371 (c)(1),
(2) Date: Jan. 12, 2015

(87) PCT Pub. No.: WO2014/009406
PCT Pub. Date: Jan. 16, 2014

(65) Prior Publication Data
US 2015/0170390 A1 Jun. 18, 2015

(30) Foreign Application Priority Data

Jul. 10, 2012 (DE) .......................... 10 2012 211 961

(51) Int. Cl.
| | |
|---|---|
| *G06K 9/36* | (2006.01) |
| *G06T 11/60* | (2006.01) |
| *G01S 11/12* | (2006.01) |
| *G06T 7/20* | (2006.01) |
| *G06K 9/00* | (2006.01) |
| *G06K 9/32* | (2006.01) |
| *G06T 3/40* | (2006.01) |

(52) U.S. Cl.
CPC ................. *G06T 11/60* (2013.01); *G01S 11/12* (2013.01); *G06K 9/00805* (2013.01); *G06K 9/3241* (2013.01); *G06T 3/40* (2013.01); *G06T 7/2033* (2013.01); *G06T 2207/30261* (2013.01)

(58) Field of Classification Search
CPC ....... G01S 11/12; G06T 11/60; G06T 7/0071; G06T 7/2033; G06T 2207/30261; G06T 3/40; G06T 3/4007; G06F 17/3025; G06F 17/30259; G06F 17/30271; G06F 17/30262; G06K 9/3241; G06K 9/00201; G06K 9/38; G06K 9/00805
See application file for complete search history.

(56) References Cited

U.S. PATENT DOCUMENTS 7,124,027 B1 * 10/2006 Ernst et al. .................... 701/301
8,417,490 B1 * 4/2013 Preston et al. .................... 703/2
(Continued)

FOREIGN PATENT DOCUMENTS

EP 1806595 7/2007
EP 2159779 3/2010

OTHER PUBLICATIONS

International Search Report for PCT/EP2013/064559, issued on Sep. 4, 2013.

*Primary Examiner* — Ali Bayat
(74) *Attorney, Agent, or Firm* — Norton Rose Fulbright US LLP

(57) ABSTRACT

A method is provided for computing a change in an image scale of an object. The method includes a step of recognizing, a step of providing, a step of scaling, a step of ascertaining, and a step of combining. Image coordinates of characteristic image areas are recognized in an instantaneous image in the step of recognizing. The characteristic image areas depict object features at least of the one object in the instantaneous image. A model is provided in the step of providing, model coordinates of the model representing a selection of positions of recognized object features of the object in a preceding image. The model is scaled in the step of scaling in order to obtain a scaled model. At least a portion of the model coordinates is correlated with the recognized image coordinates.

11 Claims, 3 Drawing Sheets

(56) References Cited

U.S. PATENT DOCUMENTS

| | | | |
|---|---|---|---|
| 8,970,401 B2 * | 3/2015 | Molander et al. | 340/961 |
| 9,208,690 B2 * | 12/2015 | Jonsson | |
| 2006/0031015 A1 * | 2/2006 | Paradie | 701/301 |
| 2011/0251768 A1 | 10/2011 | Luo et al. | |

* cited by examiner

METHOD AND DEVICE FOR COMPUTING A CHANGE IN AN IMAGE SCALE OF AN OBJECT

FIELD OF THE INVENTION

The present invention relates to a method for computing a change in an image scale of an object, a corresponding device, and a corresponding computer program product.

BACKGROUND INFORMATION

A distance from a preceding vehicle may be detected using a monocular camera system via a frame which is based on a silhouette of the vehicle.

European Patent No. 1 806 595 B1 describes a method for estimating the distance of an object, using an image sequence which is recorded with the aid of a monocular camera.

SUMMARY

Against this background, the present invention provides a method for computing a change in an image scale of an object, a device which uses this method, and lastly, a corresponding computer program product.

In ascertaining a distance from a preceding vehicle, in a distance estimation method a computation of the distance may be based on a combination of multiple submethods, each of which may be based on different algorithms. For example, results of a rapidly executable algorithm may be combined with results of a slowly executable algorithm. The rapid algorithm may provide results which have greater scattering within a broader error band than the slow algorithm, which may provide results which have lesser scattering within a narrower error band. As a result of the rapid algorithm, the distance estimation method is able to respond quickly to sudden changes. As a result of the slow algorithm, the distance estimation method may provide a smoothed value when the change in the distance is constant.

The present invention provides a method for computing a change in an image scale of an object, the method including the following steps:

recognizing image coordinates of characteristic image areas in an instantaneous image, the characteristic image areas depicting object features at least of the one object in the instantaneous image;

providing a model, model coordinates of the model representing a selection of positions of recognized object features of the object in a preceding image;

scaling the model in order to obtain a scaled model, at least a portion of the model coordinates being correlated with the image coordinates recognized in the step of recognizing, and the model and the scaled model differing from one another by a model scaling factor;

ascertaining an image scaling factor using the image coordinates of at least two recognized characteristic image areas, and image coordinates of the two image areas recognized in the preceding image; and combining the model scaling factor with the image scaling factor in order to obtain the change in the image scale.

The steps of the method may be carried out by a device situated in a vehicle. The method may be carried out while the vehicle is traveling. The object may be a preceding vehicle, for example. The vehicle may include a camera for depicting the object. An image scale may be understood to mean a factor which represents a relationship between an actual parameter of an object and a depicted parameter of the object in an image. If a focal length of a camera which detects the depiction as an image is constant, the image scale changes due to a change in a distance of the object from the camera. The change in the distance of the object from the camera may thus be deduced from the change in the image scale. An image coordinate may be an orthogonal coordinate pair of a pixel of the image in an image coordinate system of the image. A coordinate origin may be arbitrarily selected, or may be camera-specific, for example. A characteristic image area may be a group of pixels or a single pixel of the image. The characteristic image area may have a predetermined image property. For example, the characteristic image area may have a transition from a first predetermined brightness value of a first pixel to a second predetermined brightness value of an adjacent, second pixel. The characteristic image area may depict a characteristic feature of the object. For example, the image area may depict a body edge or body corner of the object as an object feature. The characteristic image area may also depict a predetermined pattern. The characteristic image area is recognized using an algorithm. The instantaneous image and the preceding image may be images of an image sequence in the same camera. The preceding image may also go back multiple images. A model may be understood to mean a point cloud composed of individual model points of relevant characteristic image areas of the object. The model may include a model coordinate system. The model points may be described by model coordinates and may have a certain relation with respect to one another. A scaling may be understood to mean an enlargement or a reduction. The model may also be shifted and/or rotated. The scaling may also be a distortion, such as a distortion of perspective. During the scaling, points of the model may be scaled or distorted until the model areas or model points match corresponding image areas or pixels of the image. The areas or points of the model may retain their original proportions. During the scaling, model areas may remain without correspondingly assigned image areas if, for example, the object is concealed at the location. If the object is once again exposed, the model areas may be re-associated with the corresponding image areas. A model scaling factor may be, for example, a percent change in the scaled model with respect to the model. An image scaling factor may be a factor by which a depiction of the object is shrunk or grown from image to image. For ascertaining the image scaling factor, at least two points per image may be detected, and distances between the points may be detected. The image scaling factor results from a change in the distances between the images. During the combination, the model scaling factor and the image scaling factor are combined with the aid of a processing rule.

The method may include a step of creating the model, in which chronologically preceding recognized image coordinates from characteristic image areas of the preceding image are used to convert at least the selection of the image coordinates into model coordinates. The image coordinates may be based on an image coordinate origin, and the model coordinates may be based on a model coordinate origin. The object may be at least partially depicted in the selection. The model may be derived from the previously detected image. The model may be derived from some other previously detected image. Portions of the image coordinates may be omitted, and the characteristic image areas may be reduced for decreasing the required computing power. For example, the selection of the characteristic image areas may be reduced to areas which are particularly well detectable in order to simplify rapid recognition in a different image. A model coordinate origin may be situated, for example, at a corner of a virtual model boundary in order to avoid negative coordinate values, for example. An image coordinate origin may be situated, for example, at a corner of the image. By use of an inherent coordinate system, the model may be adapted within the instantaneous image or a subsequent image without influencing the model coordinates. Only the image coordinate of the model coordinate origin or of an individual point of the model is changed in the process. An object description which in a manner of speaking is independent of the image may thus be achieved.

The selection may have a predefined starting dimension. During creation of the model, a predefined frame, for example, which may be square or rectangular, for example, may be projected over the image. For creation of the model, it is possible for only characteristic points within the frame to then be taken into account. The creation of the model may be speeded up in this way.

The model coordinates may be normalized, a minimum value of the model coordinates being zero and a maximum value of the model coordinates being one. The coordinates may thus describe the areas and points of the model as a percentage in relation to the model. The frame may have the coordinate values zero and one, for example.

A dimension of the model and the dimension of the scaled model may be detected, and the model scaling factor may be ascertained using a change in the dimension. For example, a dimension may be understood to mean a width of the model and/or a height of the model and/or a diagonal of the model. The model scaling factor may be deduced based on the change in the dimension. The dimension may be detected based on the frame of the model. For this purpose, the frame of the model and the frame of the scaled model may be measured. For example, an edge length of the frame may be detected as the number of pixels in the underlying image.

The model scaling factor may be weighted using a first weighting factor. The image scaling factor may be weighted using a second weighting factor. The first weighting factor and the second weighting factor may complement one another to form unity. For example, the first weighting factor may be x, while the second weighting factor is 1−x. Different intensities of the smoothing of the change in the image scale may be achieved by weighting.

The model may also be shifted by a translation vector, and alternatively or additionally, rotated by a rotation vector, in the step of scaling. A translation vector may effect a shift of the model relative to the image. A rotation vector may effect a rotation of the model relative to the image. The model may be adapted to the object by shifting and/or rotation, even if the object is depicted in the image as shifted and/or rotated.

The steps of the method may be repeated, further image coordinates of the characteristic image areas being recognized in a further image in the step of recognizing. The model or the scaled model may be provided in the step of providing. The model or the scaled model may be scaled in the step of scaling in order to obtain an additional scaled model. At least a portion of the model coordinates may be adapted to the further image coordinates, whereby the portions of different passes of the method may be different from one another. The additional scaled model may differ from the model or the scaled model (its origin) by a further model scaling factor. A further image scaling factor may be ascertained, using the further image coordinates and the originally used image coordinates, in the step of ascertaining. A further change in the image scale may be combined, using the further model scaling factor and the further image scaling factor, in the step of combining. A damping of the value of the change may be achieved by a reference to the model. A curve of the change will have a reduced number of overshoots, but only a small latency.

The steps of the method may be repeated to compute a further change in the image scale. A chronologically subsequent image depicts the characteristic object features at least of the one object at a later point in time. The scaled model is provided in the step of providing, and is scaled, using the already computed change in the image scale, to create an estimation model. The change may be used for a predetermined portion. The estimation model is scaled in the step of scaling, using a correction factor, to adapt the estimation model to the image coordinates of the chronologically subsequent image recognized in the step of recognizing. The model scaling factor is ascertained, using the computed change and the correction factor. An estimation model may be extrapolated from the scaled model. A processing time may be reduced by estimating the probable change in the model based on the preceding change, since there is a high probability that the model coordinates of the characteristic areas in the estimation model are already situated in a tolerance range about the image coordinates of the characteristic areas of the subsequent image. The provision of the estimation model may already take place in parallel with the recognition of the image coordinates of the subsequent image, since data of the subsequent image are not required for the estimation model. The model coordinates are adjusted only by the correction value.

The first weighting factor may be ascertained based on the correction factor. If the correction value is small, the weighting may be made to the benefit of the model scaling factor, resulting in a smoothing of the computed image scale. If the correction value is large, the weighting may be made to the benefit of the image scaling factor, since a rapid response may thus be made to an unexpected change between the images.

In addition, the present invention provides a device which is designed to carry out or implement the steps of the method according to the present invention in appropriate units. The underlying object of the present invention may also be achieved quickly and efficiently using this embodiment variant of the present invention in the form of a device.

In the present context, a device may be understood to mean an electrical device which processes sensor signals and outputs control and/or data signals as a function thereof. The device may include an interface which may have a hardware and/or software design. In a hardware design, the interfaces may be part of a so-called system ASIC, for example, which contains various functions of the device. However, it is also possible for the interfaces to be dedicated integrated circuits, or to be at least partially composed of discrete components. In a software design, the interfaces may be software modules which are present on a microcontroller, for example, in addition to other software modules.

Also advantageous is a computer program product including program code which may be stored on a machine-readable carrier such as a semiconductor memory, a hard drive, or an optical memory, and used for carrying out the method according to one of the above-described specific embodiments when the program product is executed on a computer or a device.

DETAILED DESCRIPTION

Figure 1:
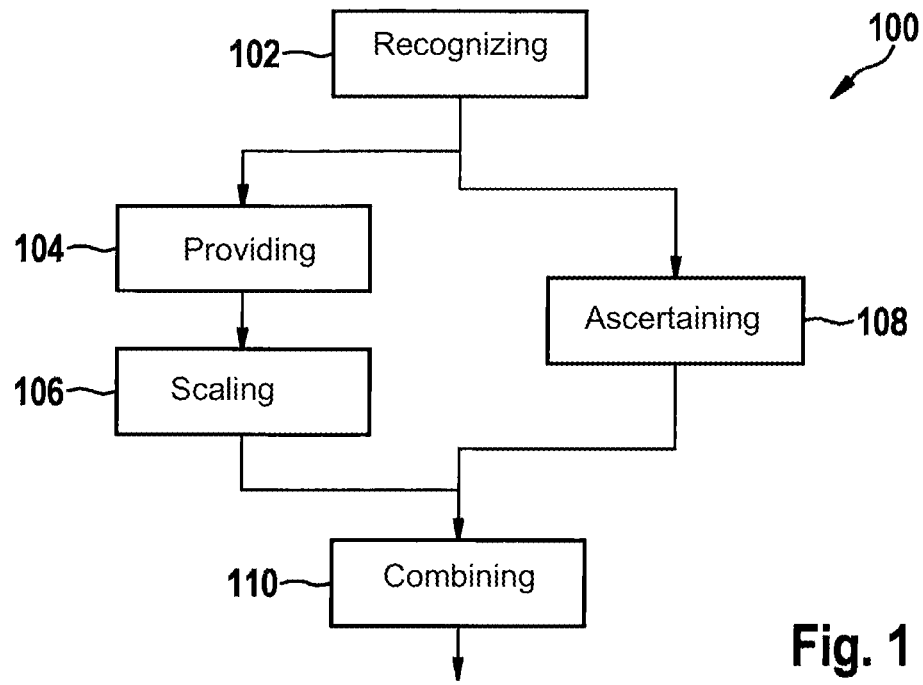
FIG. 1 shows a flow chart of a method for computing a change in an image scale of an object according to one exemplary embodiment of the present invention.

In the following description of preferred exemplary embodiments of the present invention, identical or similar reference numerals are used for the elements having a similar action which are illustrated in the various figures, and a repeated description of these elements is dispensed with.

FIG. 1 shows a flow chart of a method 100 for computing a change in an image scale of an object according to one exemplary embodiment of the present invention. The object may be an object which is detected by a surroundings detection device, for example a camera of a vehicle. For example, the object may be a preceding vehicle. Method 100 includes a step of recognizing 102, a step of providing 104, a step of scaling 106, a step of ascertaining 108, and a step of combining 110.

Image coordinates of characteristic image areas in an instantaneous image are recognized in step of recognizing 102. The characteristic image areas depict object features at least of the one object in the instantaneous image. The instantaneous image may be a single image of an image sequence, for example from a camera. A model is provided in step of providing 104. Model coordinates of the model represent a selection of positions of recognized object features of the object in a preceding image. The model is scaled in step of scaling 106 in order to obtain a scaled model. During the scaling, at least a portion of the model coordinates is adapted to the image coordinates which are recognized in the step of recognizing. For this purpose, the at least one portion of the model coordinates is correlated with the recognized image coordinates. The model and the scaled model differ by a model scaling factor. An image scaling factor is ascertained in step of ascertaining 108, using the image coordinates of at least two recognized characteristic image areas and using image coordinates of the two image areas which have been recognized in the preceding image. The model scaling factor is combined with the image scaling factor in step of combining 110 in order to obtain the change in the image scale.

In other words, FIG. 1 shows a flow chart of a method 100 for computing the change in scaling of an object between images. The change in scaling of the object width between two images is a measure for the relative speed of the object in relation to the speed of a host vehicle, and is also necessary for the three-dimensional estimation, as a control signal for the video adaptive cruise control (ACC) function, and as an input for computing the time to collision (TTC). In particular the change in scaling and the resulting TTC are very important for the vFCW NCAP test. The approach presented here describes an image processing algorithm with which the change in scaling between images may be computed with very high accuracy and little effort.

The change in scaling may be computed with the aid of correspondences between images. Under the assumption of a motion model, the change in scaling may then be ascertained directly from the estimated parameters.

The accuracy of the change in scaling depends on the accuracy of the computed correspondences. Small errors in the computation of the correspondences result in a significant error during the scaling estimation. Correspondences may be formed over multiple images, and multiple scaling values may thus be used for the final estimation, as the result of which errors may be averaged out. The correspondences should be stable over multiple images. Due to this requirement, these algorithms are too slow for use on an embedded hardware platform.

Figure 2:
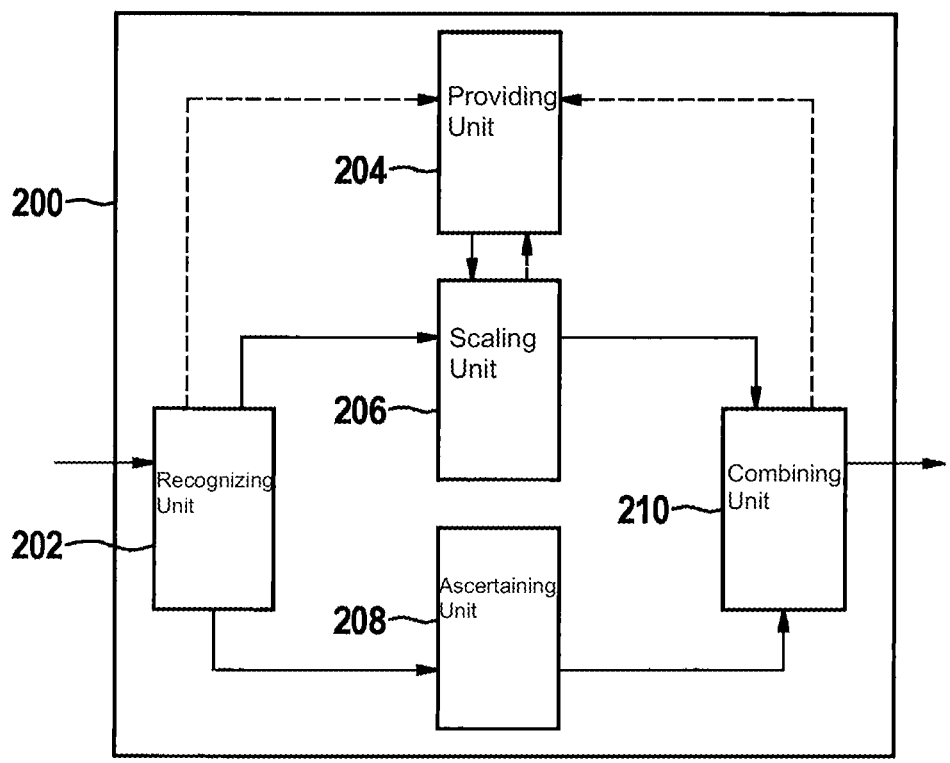
FIG. 2 shows a block diagram of a device for computing a change in an image scale of an object according to one exemplary embodiment of the present invention.

FIG. 2 shows a block diagram of a device 200 for computing a change in an image scale of an object according to one exemplary embodiment of the present invention. Device 200 includes a unit for recognizing 202, a unit for providing 204, a unit for scaling 206, a unit for ascertaining 208, and a unit for combining 210. Unit for recognizing 202 includes an interface for receiving image data. Unit for recognizing 202 may receive images, for example of a video signal from a camera, via the interface. Unit for recognizing 202 is designed for recognizing image coordinates of characteristic image areas in an instantaneous image. The characteristic image areas depict object features at least of the one object in the instantaneous image. Unit for recognizing 202 is connected to unit for scaling 206 and to unit for ascertaining 208 in order to transmit the image coordinates. Unit for providing 204 is likewise connected to unit for recognizing 202. Unit for providing 204 is designed for providing a model. Model coordinates of the model represent a selection of positions of recognized object features of the object in a preceding image. The image coordinates of the preceding image may be received by unit for recognizing 202. Unit for providing 204 is connected to unit for scaling 206 in order to transmit the model. Unit for scaling 206 is designed for scaling the model in order to obtain a scaled model. During the scaling, at least a portion of the model coordinates is adapted to the image coordinates. Model coordinates with which no image coordinate is correspondingly associated may be ignored when the model may be unambiguously scaled to form the scaled model corresponding to recognized image coordinates. The model differs from the scaled model by a model scaling factor. Unit for scaling 206 is connected to unit for combining 210 in order to transmit the model scaling factor. Unit for scaling 206 may transmit the scaled model and the model scaling factor to unit for providing 204. Unit for ascertaining 208 is designed for ascertaining an image scaling factor. For this purpose, the image coordinates of at least two recognized characteristic image areas and image coordinates of the two image areas which have been recognized in the preceding image are used. Unit for ascertaining 208 is connected to unit for combining 210 in order to transmit the image scaling factor. Unit for combining 210 is designed for combining the model scaling factor with the image scaling factor in order to obtain the change in the image scale. Unit for combining 210 includes an interface for providing the change. Unit 210 may also transmit the change to unit for providing 204. When unit for recognizing 202 recognizes subsequent image coordinates of the characteristic image areas in a subsequent image, model coordinates of the scaled model may be scaled in unit for scaling 206 in order to be adapted to the subsequent image coordinates. Alternatively, an estimation model may be generated in unit for providing 204 from the received scaled model, using the preceding computed change or the received model scaling factor, in order to obtain expected positions of the characteristic image areas in the subsequent image. The estimation model may in turn be scaled in unit for scaling 206, using a correction factor, in order to adjust the expected positions to actual positions of the characteristic image areas and generate another scaled model. The model scaling factor may then be determined, using the preceding change and the correction value. The image scaling factor of the subsequent image may be ascertained in unit for ascertaining 208, the same as for the instantaneous image, in which case image coordinates of the instantaneous image and of the subsequent image are used.

Figure 3:
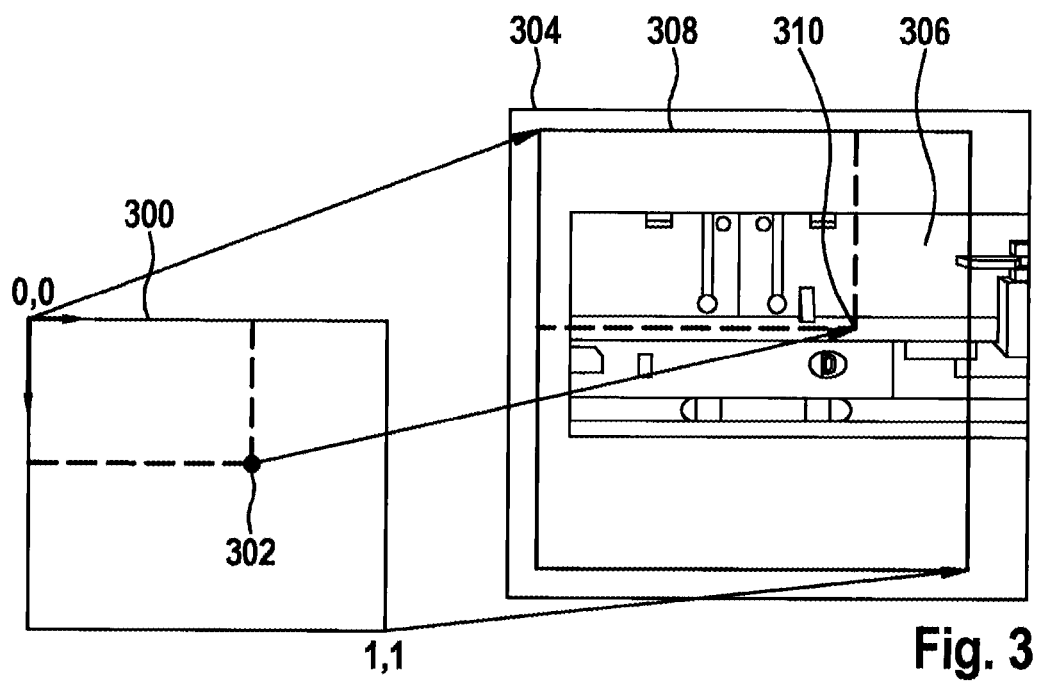
FIG. 3 shows an illustration of a model which is scaled to form a scaled model according to one exemplary embodiment of the present invention.

FIG. 3 shows an illustration of a model 300 which is scaled according to one exemplary embodiment of the present invention to form a scaled model. Model 300, a coordinate point 302, a camera image 304, an object 306, a scaled model 308, and a pixel coordinate point 310 are illustrated in FIG. 3. Model 300 has area boundaries having a rectangular contour. A model coordinate origin is situated in an upper left corner of the area boundaries. In the model coordinate origin, model coordinates of model 300 have a horizontal value of 0 and a vertical value of 0. In a lower right corner, the model coordinates have a horizontal value of 1 and a vertical value of 1. The area boundaries are thus normalized to 1. Model coordinate 302 is shown within the area boundaries for a plurality of model coordinate points as an example. Model coordinate 302 represents a position of a characteristic image area of a camera image on which model 300 is based. The model coordinate system is two-dimensionally and orthogonally linear. At the point of model coordinate 302, two auxiliary lines therefore intersect perpendicularly, with the aid of which the model coordinate values of model coordinate 302 may be ascertained more easily at the area boundaries.

A detail of camera image 304 is illustrated in addition to model 300. Camera image 304 shows a detail of object 306 in the field of vision of the camera. A detail of a utility vehicle 306 is illustrated in this exemplary embodiment. Scaled model 308 is superimposed on camera image 304. Scaled model 308 is similar to model 300. In this exemplary embodiment, scaled model 308 is larger than model 300 by a model scaling factor due to the fact that, since the generation of model 300, object 306 has approached the camera, with reference to a preceding camera image of object 306, and is therefore depicted to be larger in camera image 304. If object 306 had moved away from the camera in the time period between the images, object 306 would be smaller in camera image 304, and therefore scaled model 308 would be smaller than model 300 by a model scaling factor. Pixel 310 is situated at a position of a characteristic image area of object 306. Model coordinate 302 describes a model relative position of the same characteristic image area in the preceding camera image. Based on shifts of image coordinates of at least two such points in camera image 304, model 300 is scaled and/or shifted or distorted, and overlaid on image 304. A portion of the model coordinates may remain disregarded, for example if the associated image area is concealed, or, for example, because the model coordinate describes an image area of the preceding camera image in which a characteristic image area has been erroneously recognized. The model scaling factor may be determined, for example, by subtracting an image coordinate value of the upper left corner of scaled model 308 from an image coordinate value of the lower right corner of scaled model 308 in order to obtain a dimension parameter of scaled model 308. The model scaling factor may be determined from at least two chronologically successive dimension parameters. A time curve of the model scaling factor may be smoothed by using multiple dimension parameters.

Since the images of the camera follow one another in brief time intervals, object 306 may only undertake a motion between the images which is limited by physical laws. Therefore, the depiction of object 306 in successive camera images may have only a limited change. Due to an assumption of an approximately constant model scaling factor within a limited time period, for example three successive camera images, a time period which is necessary for scaling model 300 may be shortened. Scaled model 308 may be rescaled, using the model scaling factor or a computed change between two images, in order to obtain an estimation model. The estimation model may be generated before the subsequent camera image is examined for characteristic image areas. Thus, the estimation model represents probable positions of the characteristic image areas in the subsequent image. The probable positions may be compared to the actual image coordinates of the subsequent image in order to obtain a correction factor. The correction factor describes the remaining necessary scaling of the estimation model in order to adapt the estimation model to the actual image coordinates. The actual model scaling factor may then be determined from the preceding model scaling factor, or from the computed change and the correction value.

The approach presented here describes an image processing algorithm which computes the change in scaling of an object 306 between images 304. This image processing algorithm may be used for computing the relative speed of object 306 and its TTC at a position of the camera.

The computation of the change in scaling is filtered at various times, using the object width. The noise is thus significantly suppressed without increasing the latency. For this purpose, it is important that the measurement of the object width takes place as the primary measurement.

The method is initialized in that for a starting image of object 306, an object box is defined in the area of object 306, based on the particular object classifier. Feature points 310 are then extracted within this box. Feature points 310 are subsequently normalized to the object width, so that at the end, only points 302 having coordinates between 0 and 1 exist. Normalized object box 300 is then stored as an object model 300.

In the next image, initially feature points 310 are extracted, and then correlated with corresponding preceding feature points 310 with the aid of their descriptors. The motion parameters between normalized coordinates 302 of object model 300 and coordinates 310 in instantaneous image 304 are subsequently estimated. Points 0,0 and 1,1 are then projected into instantaneous image 304 with the aid of the estimated motion parameters, and lastly, the object width is ascertained by simple subtraction.

Width=point (1,1) in image−point (0,0) in image

The formula describes one example for computing the object width from the back-projection in image 304 of normalized coordinates 302.

The object width is always remeasured in each frame 308 and stored in a "circular buffer." If necessary, the width and the height of object 306 may be computed separately.

When the object width has been computed in instantaneous image 304, all points outside box 308 may be discarded. The change in scaling of image coordinates 310 may subsequently be computed, using a linear approach. The motion parameters of the pixels corresponding to image coordinates 310 may be used for this purpose. This results in change in scaling $S_S$.

Multiple scaling values are computed with the aid of the object widths stored in the circular buffer. This results in change in scaling $S_{Bi}$, where i is the index of the time, which may be present at any arbitrary time in the past. Counting into the past is performed from instantaneous image 304 $T_i$ (for example, $T_N \leftarrow T_4 \leftarrow T_3 \leftarrow T_2 \leftarrow T_i$).

Under the assumption that the change in scaling remains constant for a limited number of values, the curve of the object width may be computed using the following formula, where $B_i$ is the object width in instantaneous image 304 and S is the constant scaling.

$$B_1 = B_i \cdot S^{i-1}$$

The formula describes a computation of the object width with a constant change in scaling.

Scaling $S_B$ may be computed from the N object width values, using the following formulas.

$$S_B = \frac{1}{N-1} \sum_{i=1}^{N-1} \left(\frac{B_1}{B_{i+1}}\right)^{\frac{1}{i}}$$

The formula describes a computation of the change in scaling based on the first object width.

$$S_B = \frac{1}{N-1} \sum_{i=1}^{N-1} \left(\frac{B_1}{B_{i+1}}\right)$$

The formula describes a computation of the change in scaling based on the adjacent object widths.

The final computation of the change in scaling is carried out under the assumption that the change in scaling is constant for a limited number of values. Change in scaling $S_B$ may therefore be computed from the widths. The final change in scaling is then computed as a weighted average from direct scaling $S_S$ and from the scaling from object width $S_B$.

$$S = w \cdot S_S + (1-w) \cdot S_B$$

The formula describes a computation of the final change in scaling, where w is the weighting of the direct measurement on the final result.

Figure 4:
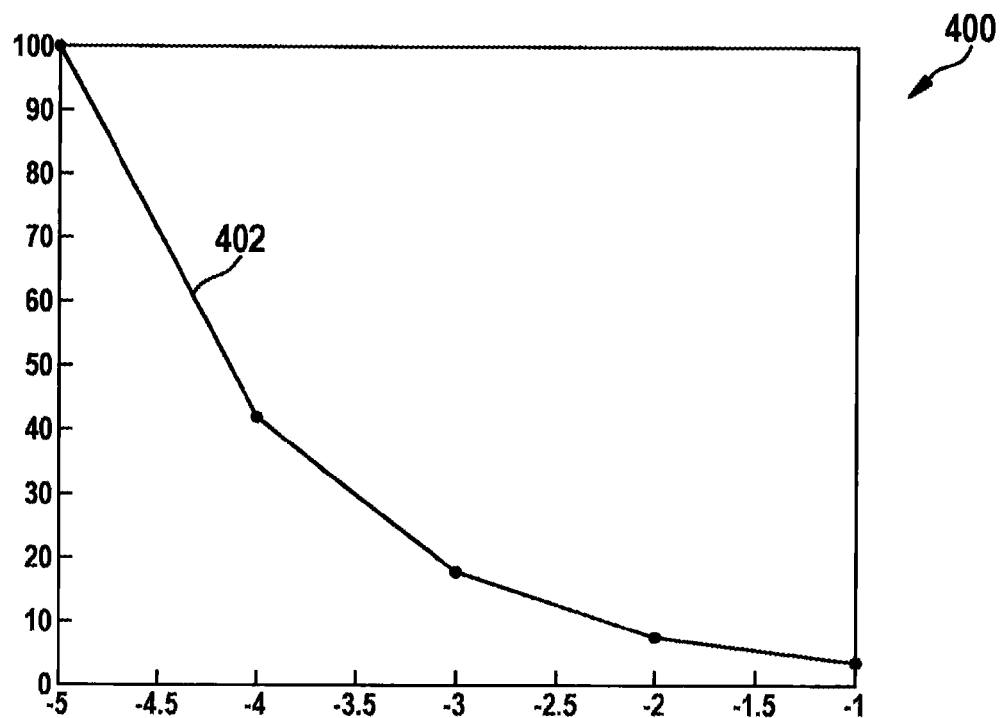
FIG. 4 shows a diagram of a time curve of a dimension of an object during a constant change in a scaling factor.

FIG. 4 shows a diagram 400 of a time curve 402 of a dimension of an object with constant change of a scaling factor. Time is indicated on the abscissa, and object width is indicated on the ordinate. A time period of four time units is depicted in the illustrated example, the object having been detected at the beginning of the time period. A model of the object has been created during the first detection. The model has an object width of 100 percent. The object is moving away, and therefore is depicted as being smaller. The model is adapted to the depiction, and becomes increasingly smaller. At the end of the time period, the object has moved far away, and the model has only approximately three percent of its original object width. The model has been scaled with a constant change over the time period, since the object has moved away at constant speed. This results in an exponential decrease in curve 402 of the object width. FIG. 4 shows a curve of the object width with a constant change in scaling, on the basis of which a scale estimation is possible.

Figure 5:
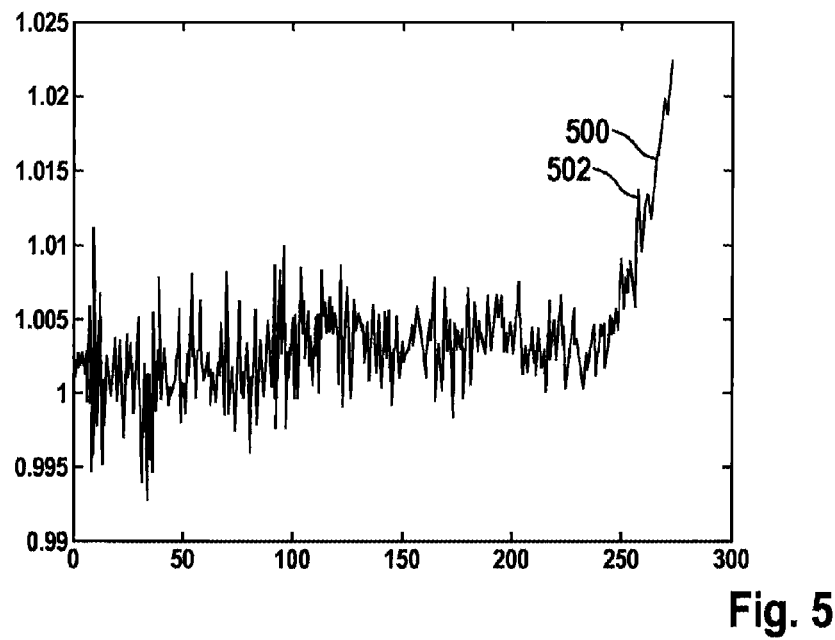
FIG. 5 shows an illustration of a time curve of a change in an image scale according to one exemplary embodiment of the present invention.

FIG. 5 shows an illustration of a time curve 500 of a change in an image scale according to one exemplary embodiment of the present invention. Curve 500 is plotted in a diagram. An additional curve 502 is plotted in the diagram. Time is indicated on the abscissa of the diagram, and the image scale or the scaling is indicated on the ordinate. Curve 500 begins at a point in time zero with an image scale of one. Additional curve 502 represents a change in the image scale without using the approach presented here. Additional curve 502 likewise begins at point in time zero with the image scale of one. Both curves 500, 502 are based on identical image data of a camera. Curve 500 results from a method for computing a change in an image scale of an object according to one exemplary embodiment of the present invention. The additional curve is a result of a less efficient computation method. Both curves 500, 502 initially have a slight rise to an image scale of 1.0025 up to a point in time 250. The rise in additional curve 502 is superimposed with strong noise. The noise is considerably weaker for curve 500 than for additional curve 502. Beginning at point in time 250, both curves 500, 502 have a further rise up to an image scale of 1.022. The further rise of the two curves is virtually simultaneous, but curve 500 has less noise than additional curve 502. Curve 502 describes an original change in scaling from the correspondences. Curve 500 describes a post-filtering of the computed scaling with the aid of multiple object widths. For the filtered signal, the noise is greatly suppressed without introducing latency.

Curves 500, 502 are directly superimposed on one another in FIG. 5 in order to show the minimal time offset of the two curves 500, 502.

Figure 6:
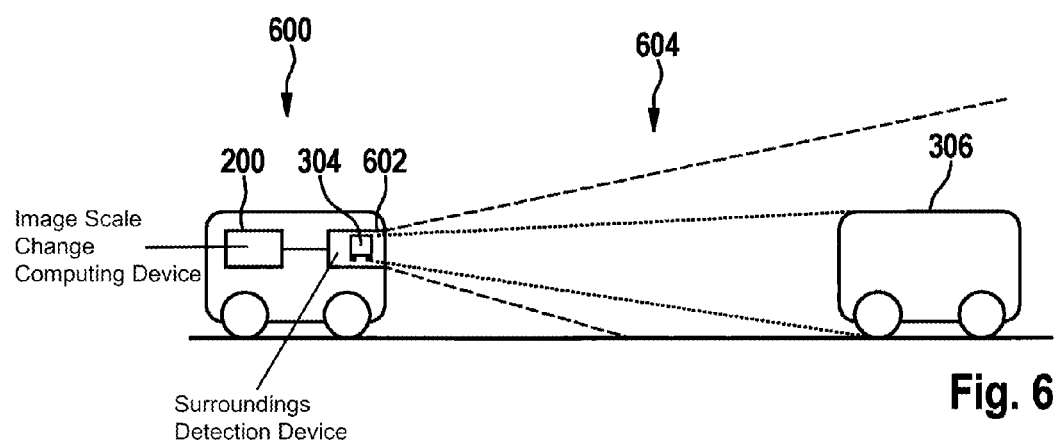
FIG. 6 shows an illustration of a vehicle which includes a device for computing a change in an image scale of an object according to one exemplary embodiment of the present invention.

FIG. 6 shows an illustration of a vehicle 600 which includes a device 200 for computing a change in an image scale of an object 306 according to one exemplary embodiment of the present invention. Device 200 may be, for example, the device described with reference to FIG. 2. Vehicle 600 includes a surroundings detection device 602. In this exemplary embodiment, surroundings detection device 602 is a camera 602 which is designed for detecting at least one detail 604 of a visual field of a driver of vehicle 600 and for depicting same in an image sequence composed of camera images 304. Camera 602 is connected to device 200. Object 306 is situated within detected detail 604. In this exemplary embodiment, object 306 is another vehicle 306 of another road user which is traveling ahead of vehicle 600.

Other vehicle 306 is depicted to be larger in camera image 304 the closer other vehicle 306 is to vehicle 600. If a distance between vehicle 600 and other vehicle 306 changes from an earlier recording point in time to a later recording point in time of the image sequence, other vehicle 306 is depicted with a changed image scale in camera image 304. The change is computed in device 200, using a method for computing the change in the image scale of object 306 according to the approach presented here. At least a partial area of camera image 304, which depicts at least one detail of vehicle 306, is examined for characteristic image areas. Characteristic image areas depict characteristic features of vehicle 306. The characteristic image areas have image coordinates. Model coordinates of a model are thus scaled and/or shifted and/or rotated and/or distorted, using a first algorithm, until the scaled model coordinates correspond to at least a portion of the image coordinates. The model represents locations of characteristic features of vehicle 306 in an earlier camera image 304 at a previous point in time. A model scaling factor results from the first algorithm. The first algorithm is robust due to the use of a plurality of model coordinates and a plurality of image coordinates, and may continue to run stably in the event of an image interference, for example a temporary obstruction of vehicle 306. The image coordinates are additionally evaluated with the aid of a second algorithm in order to obtain an image scaling factor. For this purpose, distances between at least two image coordinates are detected from camera image 304 to camera image 304, the image coordinates each being associated with characteristic image areas of the same characteristic features. Since the second algorithm is based on distance computations, the change from image to image may be ascertained virtually without delay. To filter the resulting strong noise in the image scaling factor, the change in the image scale is computed using a mixture of the model scaling factor and the image scaling factor.

The exemplary embodiments which are described and shown in the figures are selected only as examples. Different exemplary embodiments may be combined with one another in their entirety, or with respect to individual features. In addition, one exemplary embodiment may be supplemented with features of another exemplary embodiment. Furthermore, method steps according to the present invention may be repeated and carried out in a sequence other than that described. An exemplary embodiment which includes an "and/or" linkage between a first feature and a second feature may be construed in such a way that according to one specific embodiment, the exemplary embodiment includes the first feature as well as the second feature, and according to another specific embodiment includes only the first feature or only the second feature.

What is claimed is:

1. A method for computing a change in an image scale of an object, comprising:
   recognizing image coordinates of characteristic image areas in an instantaneous image, the characteristic image areas depicting object features at least of the one object in the instantaneous image;
   providing a model, wherein model coordinates of the model represent a selection of positions of recognized object features of the object in a preceding image;
   scaling the model in order to obtain a scaled model, at least a portion of the model coordinates being correlated with the image coordinates recognized in the step of recognizing, and the model and the scaled model differing from one another by a model scaling factor;
   ascertaining an image scaling factor using the image coordinates of at least two recognized characteristic image areas, and image coordinates of the two image areas recognized in the preceding image; and
   combining the model scaling factor with the image scaling factor in order to obtain the change in the image scale.

2. The method as recited in claim 1, further comprising:
   creating the model, wherein chronologically preceding recognized image coordinates from characteristic image areas of the preceding image are used to convert at least the selection of the image coordinates into model coordinates, the image coordinates being based on an image coordinate origin, and the model coordinates being based on a model coordinate origin, the object being at least partially depicted in the selection.

3. The method as recited in claim 2, wherein the selection has a predefined starting dimension in the step of creating.

4. The method as recited in claim 2, wherein the model coordinates are normalized in the step of creating, a minimum value of the model coordinates being zero and a maximum value of the model coordinates being one.

5. The method as recited in claim 1, wherein a dimension of the model and a dimension of the scaled model are detected in the step of scaling, and the model scaling factor is ascertained using a change in the dimension.

6. The method as recited in claim 1, wherein the model scaling factor is weighted with a first weighting factor, and the image scaling factor is weighted with a second weighting factor, in the step of combining.

7. The method as recited in claim 6, wherein the steps of the method are repeated to compute a further change in the image scale, a chronologically subsequent image depicting the characteristic object features at least of the one object at a later point in time, the scaled model being provided in the step of providing, and being scaled, using the already computed change in the image scale, to create an estimation model, the estimation model being scaled in the step of scaling, using a correction factor, to adapt the estimation model to the image coordinates of the chronologically subsequent image recognized in the step of recognizing, the model scaling factor being ascertained using the computed change and the correction factor.

8. The method as recited in claim 7, wherein the first weighting factor is ascertained in the step of combining, based on the correction factor.

9. The method as recited in claim 1, wherein the model is at least one of shifted by a translation vector and rotated by a rotation vector in the step of scaling.

10. A device for computing a change in an image scale of an object, comprising:
    a hardware interface unit including an integrated circuit configured to recognize image coordinates of characteristic image areas in an instantaneous image, the characteristic image areas depicting object features at least of the one object in the instantaneous image;
    a hardware modeling unit including an integrated circuit configured to provide a model, wherein model coordinates of the model represent a selection of positions of recognized object features of the object in a preceding image;
    a hardware scaling unit including an integrated circuit configured to scale the model in order to obtain a scaled model, at least a portion of the model coordinates being correlated with the image coordinates recognized in the step of recognizing, and the model and the scaled model differing from one another by a model scaling factor;
    a hardware ascertaining unit including an integrated circuit configured to ascertain an image scaling factor using the image coordinates of at least two recognized characteristic image areas, and image coordinates of the two image areas recognized in the preceding image; and
    a hardware combining unit including an integrated circuit configured to combine the model scaling factor with the image scaling factor in order to obtain the change in the image scale.

11. A non-transitory, computer-readable medium storing a computer program product including program code for carrying out a method for computing a change in an image scale of an object, the method comprising:
    recognizing image coordinates of characteristic image areas in an instantaneous image, the characteristic image areas depicting object features at least of the one object in the instantaneous image;
    providing a model, wherein model coordinates of the model represent a selection of positions of recognized object features of the object in a preceding image;
    scaling the model in order to obtain a scaled model, at least a portion of the model coordinates being correlated with the image coordinates recognized in the step of recognizing, and the model and the scaled model differing from one another by a model scaling factor;
    ascertaining an image scaling factor using the image coordinates of at least two recognized characteristic image areas, and image coordinates of the two image areas recognized in the preceding image; and
    combining the model scaling factor with the image scaling factor in order to obtain the change in the image scale.

* * * * *